US008469805B2

(12) United States Patent
Kilgore et al.

(10) Patent No.: US 8,469,805 B2
(45) Date of Patent: *Jun. 25, 2013

(54) TIERED ACHIEVEMENT SYSTEM

(75) Inventors: Benjamin F. Kilgore, Redmond, WA (US); Michal Bortnik, Seattle, WA (US); Patrick W. O'Kelley, II, Seattle, WA (US); Vincent H. Curley, Bellevue, WA (US); Alan T. Shen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1500 days.

This patent is subject to a terminal disclaimer.

(21) Appl. No.: 11/335,972

(22) Filed: Jan. 20, 2006

(65) Prior Publication Data
US 2007/0173327 A1 Jul. 26, 2007

(51) Int. Cl.
A63F 9/24 (2006.01)
A63F 13/00 (2006.01)
G06F 17/00 (2006.01)
G06F 19/00 (2011.01)

(52) U.S. Cl.
USPC .................. 463/29; 463/16; 463/20; 463/25; 463/42; 273/138; 273/143

(58) Field of Classification Search
USPC .................. 463/16, 29, 42, 20, 25; 273/138, 273/143
See application file for complete search history.

(56) References Cited

U.S. PATENT DOCUMENTS

| 6,692,359 | B1 | 2/2004 | Williams et al. ............... 463/42 |
| 6,821,205 | B2 | 11/2004 | Takahashi et al. |
| 7,402,105 | B1* | 7/2008 | Hutter et al. .................... 463/42 |
| 7,711,847 | B2 | 5/2010 | Dhupelia et al. |
| 2002/0025853 | A1* | 2/2002 | Kojima et al. .................. 463/42 |
| 2002/0049507 | A1* | 4/2002 | Hameen-Anttila ............. 700/92 |
| 2002/0164564 | A1* | 11/2002 | Fretwell, Jr. .................. 434/188 |
| 2003/0069773 | A1* | 4/2003 | Hladik et al. ...................... 705/7 |
| 2004/0097287 | A1 | 5/2004 | Postrel |
| 2006/0128421 | A1* | 6/2006 | van Rooyen ............... 455/552.1 |
| 2006/0128471 | A1* | 6/2006 | Willis et al. .................... 463/42 |

(Continued)

FOREIGN PATENT DOCUMENTS
CN 1556958 A 12/2004
JP 2003-93745 A 4/2003

(Continued)

OTHER PUBLICATIONS

Matthias99, "GameFAQs: Battlefield 1942 FAQ/Strategy Guide," Mar. 19, 2003, http://www.gamefaqs.com/computer/doswin/file/466245/21375.

(Continued)

Primary Examiner — Omkar Deodhar
Assistant Examiner — Adetokunbo O Torimiro
(74) Attorney, Agent, or Firm — Woodcock Washburn, LLP

(57) ABSTRACT

A game console has the capability to execute programming to unlock an achievement. After the achievements are unlocked, a data store accessible by the game console over a network stores the information in the profile of the user. The achievements associated with the user profiles can be retrieved from the store along with an indicator, that is indicative of a tier level associated with the achievement where the tier indicates a certain performance level associated with unlocking a particular achievement.

18 Claims, 8 Drawing Sheets

U.S. PATENT DOCUMENTS

| | | | |
|---|---|---|---|
| 2006/0224615 A1* | 10/2006 | Korn et al. | 707/102 |
| 2006/0258463 A1* | 11/2006 | Cugno et al. | 463/42 |
| 2007/0111775 A1* | 5/2007 | Yoseloff | 463/16 |
| 2007/0143341 A1* | 6/2007 | Brownell et al. | 707/104.1 |
| 2007/0173321 A1 | 7/2007 | Shen et al. | |

FOREIGN PATENT DOCUMENTS

| | | |
|---|---|---|
| JP | 2005-531048 A | 10/2005 |
| KR | 10-2003-0019964 | 3/2003 |
| KR | 10-2004-0013264 | 2/2004 |
| WO | WO 03/091894 | 11/2003 |
| WO | WO 2007/084224 | 7/2007 |

OTHER PUBLICATIONS

PCT International Search Report mailed May 7, 2007, issued in corresponding PCT International Application No. PCT/US2006/047324.

PCT International Preliminary Report on Patentability issued Jul. 22, 2008, issued in corresponding PCT International Application No. PCT/US2006/047324.

United States Patent and Trademark Office: Non-Final Office Action dated Oct. 9, 2008, U.S. Appl. No. 11/335,966, filed Jan. 20, 2006.
United States Patent and Trademark Office: Final Office Action dated Jul. 2, 2009, U.S. Appl. No. 11/335,966, filed Jan. 20, 2006.
United States Patent and Trademark Office: Non-Final Office Action dated Dec. 16, 2009, U.S. Appl. No. 11/335,966, filed Jan. 20, 2006.
"Activision Patch Gallery", http://www.atariage.com/2600/archives/activision_patches.html, AtariAge, accessed Aug. 31, 2011, 8 pages.
"UBAR—The Unofficial Battlefield 2 Awards and Ranks Guide", http://web.archive.org/web/20051126121037/http://ubar.bf2s.com/badges.php, BFS2.com, accessed Aug. 31, 2011, 6 pages.
"Episode 2—Dashboard" (video citation), http://www.gametrailers.com/video/episode-2-xbox-360/7827, GameTrailers.com, accessed Sep. 22, 2011, transcript and screenshots 10 pages.
"Battlefield 2," LOGiN vol. 24, No. 11, pp. 130-133, Enterbrain, Inc., Nov. 1, 2005.
"Mabinogi Official Guide, 2005. 6," The First Edition, p. 13, KOEI Co., Ltd., Jun. 23, 2005.
English translation of the Office Action dated Aug. 31, 2012, for Japanese Patent Application No. 2008-551264, 4 pages.

\* cited by examiner

TIERED ACHIEVEMENT SYSTEM

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2006, Microsoft Corporation, All Rights Reserved.

FIELD OF THE INVENTION

This invention generally relates to the field of gaming and multimedia devices.

BACKGROUND OF THE INVENTION

In online gaming, game hosting services and game developers have created a number of ways to track and personalize the online gaming experience. A drawback of existing systems is that many of the features have grown up independent of each other. Games send blobs of data about gamers back and forth to a central service, but the service has no way to understand and aggregate the data outside of the game context. Games can host their own Websites, but the data displayed there is not universally accessible to other games.

In a sense, then, the service and games offer two parallel communities that offer great—but separated—resources for gamers. First, in the game community, while playing a game, the gamer can see the community of others who play the specific game, the leaderboards for that game, and his personal achievements in that game. A game can tell a gamer, from the Service data, if a Friend is online, but it can't tell the gamer what, exactly that Friend is doing on the Service or when he will be available.

Second, in the service community, the service knows a gamer player's history, all of the games he's played, the amount of time he spends online, the size of his Friends list and all of the games that Friends have played or are playing, and feedback the gamer has given and received.

Systems have tried to leverage these on-line communities to match various players to allow them to play multi-player games. Nevertheless, in general such systems, which typically emphasize skill or experience in a single game or small family of games, there is a desire to provide mechanisms to find similarly skilled players or to determine the skill level

SUMMARY OF THE INVENTION

The invention contemplates systems, methods and computer-readable media for displaying achievement tiers for players in a gaming environment. The system comprises a data store that stores a plurality of user profiles which comprise information gathered from users playing one or more video games on a game console. Various achievements attained by the players are associated with the user profile and includes achievement graphic or stamps for unlocking various achievements in particular games.

A game console has the capability to execute programming to unlock an achievement. After the achievements are unlocked, a data store accessible by the game console over a network, stores the information in the profile of the user. The achievements associated with the user profiles can be retrieved from the store along with an indicator, that is indicative of a tier level associated with the achievement where the tier indicates a certain performance level associated with unlocking a particular achievement.

The game console is capable of displaying the achievements and associated indicators of a tier level retrieved from said data store. The achievements and indicators of tier level can also be retrieved from the data store over a network using a browser operating on a personal computer or other computing device.

The tier levels can be displayed in a variety of ways. For example, a color of the achievement stamp can itself reflect the achievement tier level. Alternatively, a number or other indicator can be embedded into the achievement stamp to provide a visual cue about the relative tier level achieved by a user or a progress bar can be used in conjunction with the achievement stamp to provide an indication of the tier level.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
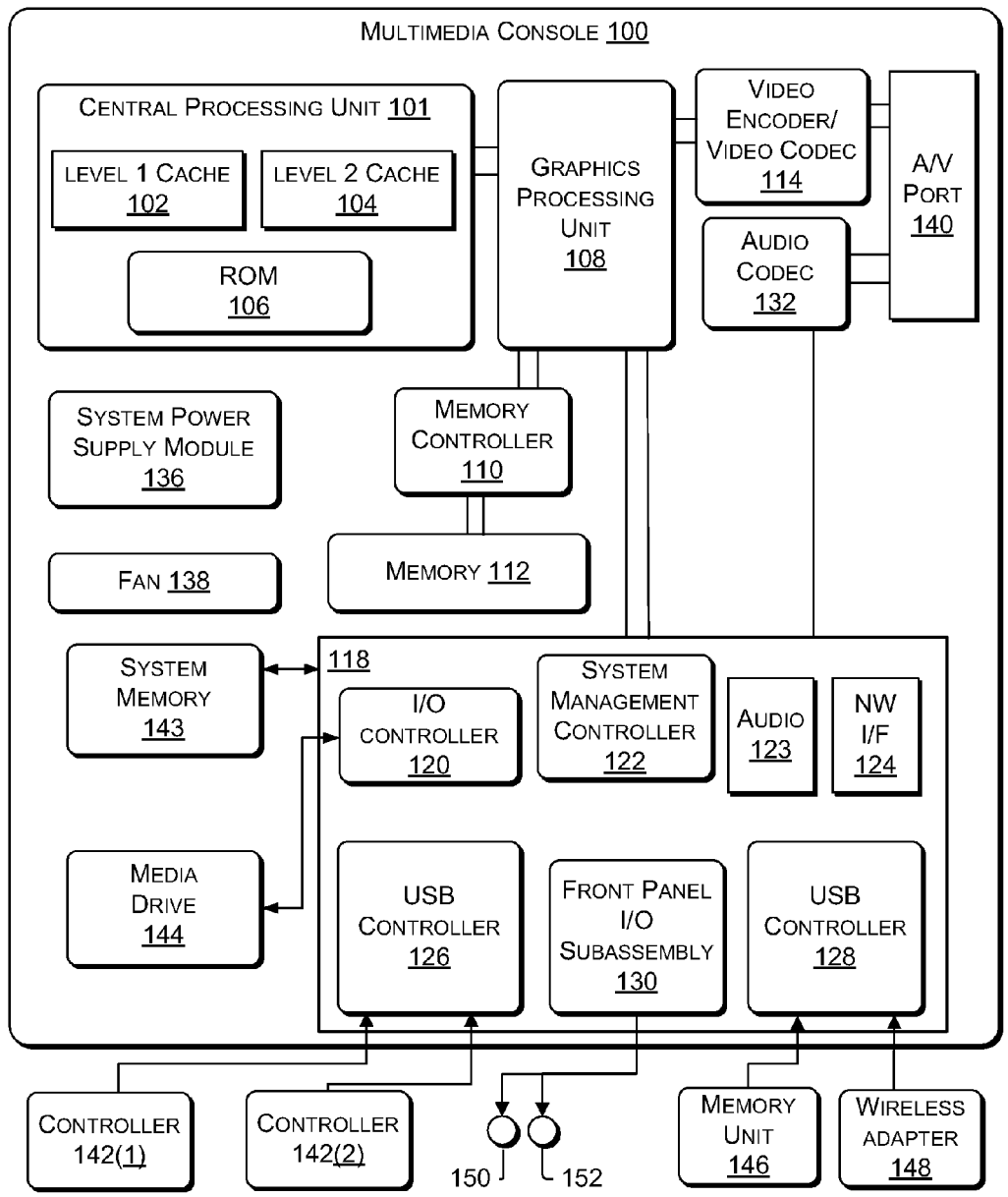
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

In the system described herein a "Gamer Profile" serves as a building block for services and applications that aim to create a social community of gamers and to grow relationships among players. Accordingly, the Gamer Profile is the entirety of information (e.g., metadata) related to a specific user (i.e., the gamer's digital identity). The Gamer Profile is developed from a set of services that collect and expose this information in a meaningful way to the community. The Gamer Profile also provides for personalization such that users can customize and enhance their gaming experience. As will be discussed in greater detail below, the Gamer Profile consists of various components, including, but not limited to, a Gamercard, game achievements, and gamer preferences.

Figure 2:
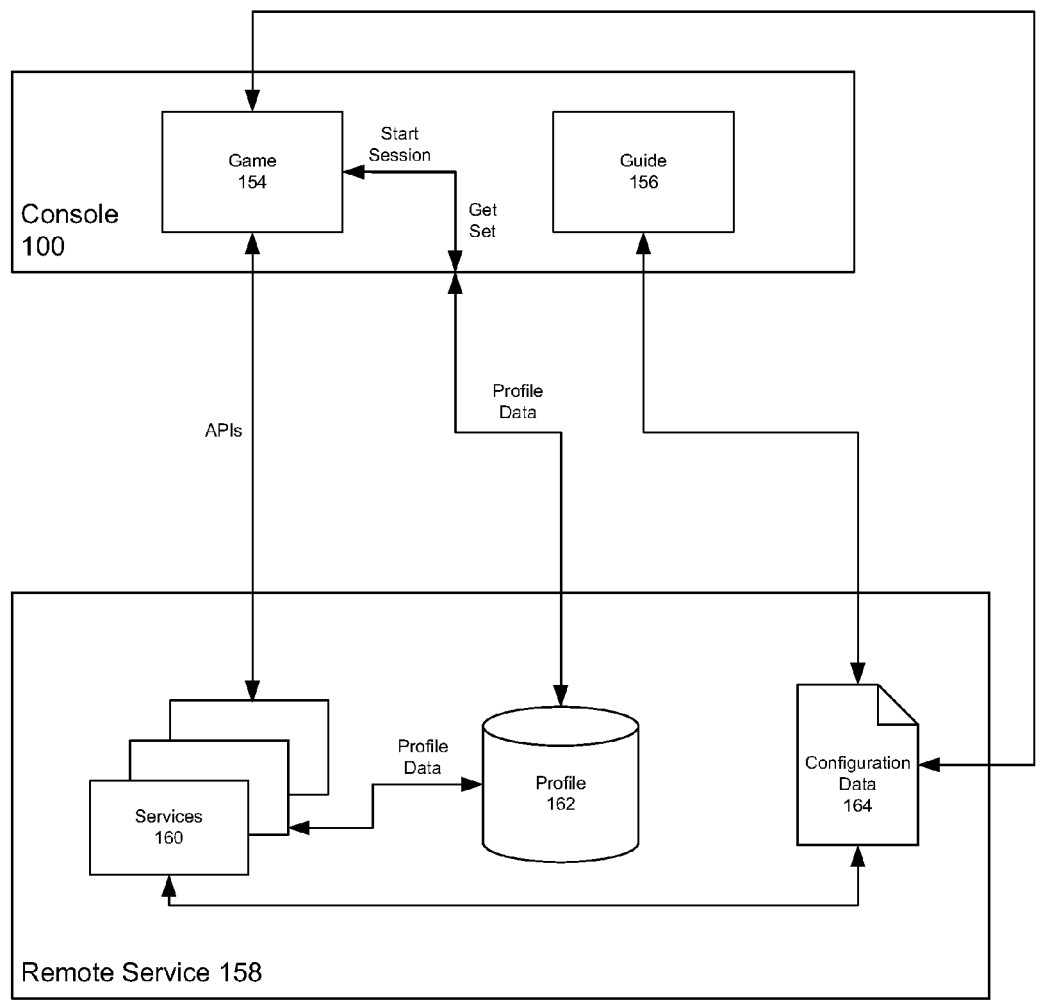
FIG. 2 illustrates an exemplary architecture in which the present invention may be implemented.

Referring to FIG. 2, there is illustrated an overview of an exemplary architecture that may be used to implement the Gamer Profile. The console 100 interacts with a remote service 158 that provides services 160 such as voice/chat, a friends list, matchmaking, content download, roaming, feedback, tournaments, voice messaging, and updates to gamers. The service 158 also maintains the Gamer Profiles in a profile database 162 and configuration data 164 used by the services 160 and games 154. The service 158 collects Gamer Profiles, aggregates, processes information supplied by other services 160, and fulfills real-time client requests for retrieving Gamer Profile-related services. The Gamer Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. The configuration data 164 stored by the service 158 may be used to determine features and options provided by the guide 156. When the game 154 is running, a defined set of APIs are used to call and interact with the services 160. When requesting Gamer Profile information via the APIs, the game 154 may pass a unique identifier of a user. The service 158 may return a Gamercard (discussed below), game stats, game achievements, affiliations, game settings. etc. Additional details of the various aspects of the exemplary architecture are provided below.

Figure 3:
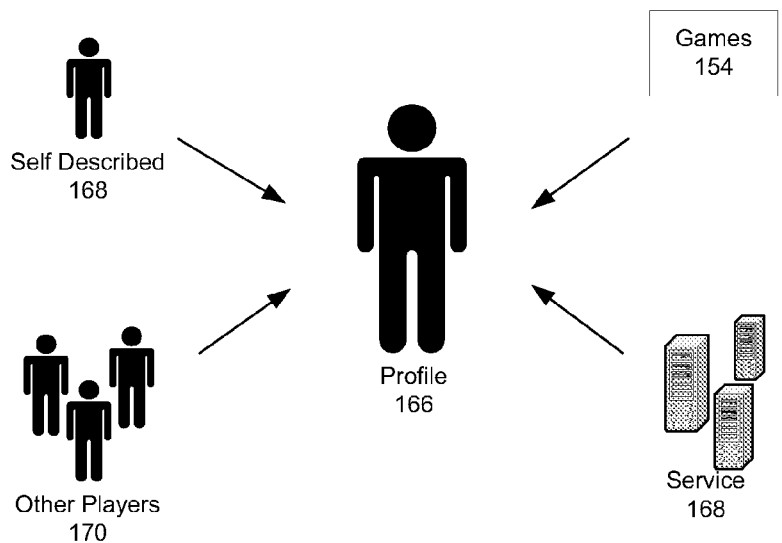
FIG. 3 illustrates sources of information that provide input to a Gamer Profile.

Referring to FIG. 3, the Gamer Profile 166 is created when a user creates a profile (selected from the guide 156) and chooses his/her unique Gamertag (a user's unique name), tile (picture/avatar associated with the user) other options during an account sign-up phase. From there, a base Gamer Profile 166 is created. The Gamer Profile 166 may then be populated from several sources. For example, the Gamer Profile 166 may include self-described data 168 from the Gamer Profile owner. Other gamers 170 can provide feedback regarding the Gamer Profile owner. The service 158 may track the gamer's online and offline activity. In addition, the games 154 may report the gamer's statistics and game achievements.

The owner of Gamer Profile can edit his/her Gamer Profile 166 directly and control who can view each section of the Gamer Profile. The Gamer Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the Gamer Profile to, e.g., restrict presence information only to friends, allow game achievements to be visible to all, etc.

The Gamer Profile 166 may include feedback provided by other players 170. Feedback helps others learn about a particular gamer. For example, if the gamer uses foul language or aggressive play in game sessions, other gamers may submit feedback to the service 158. The feedback mechanism improves the user experience by building reputations. Players are therefore anonymous, but not unknown because of the accumulated feedback.

As noted above the Gamer Profile 166 may be used for customization and preference setting on a global level, as well as a per game level. Gamer preferences aid games 154 in choosing defaults for common settings such as game profile name, controller inversion and controller vibration, etc. For example, if a gamer likes using an inverted controller, this preference will be used for new titles as they are played. Games 154 have access to Gamer Profiles via the database 162 and services 160. In addition, game usage data can be mined to tune the game 154 to the user's particular preferences.

Figure 4:
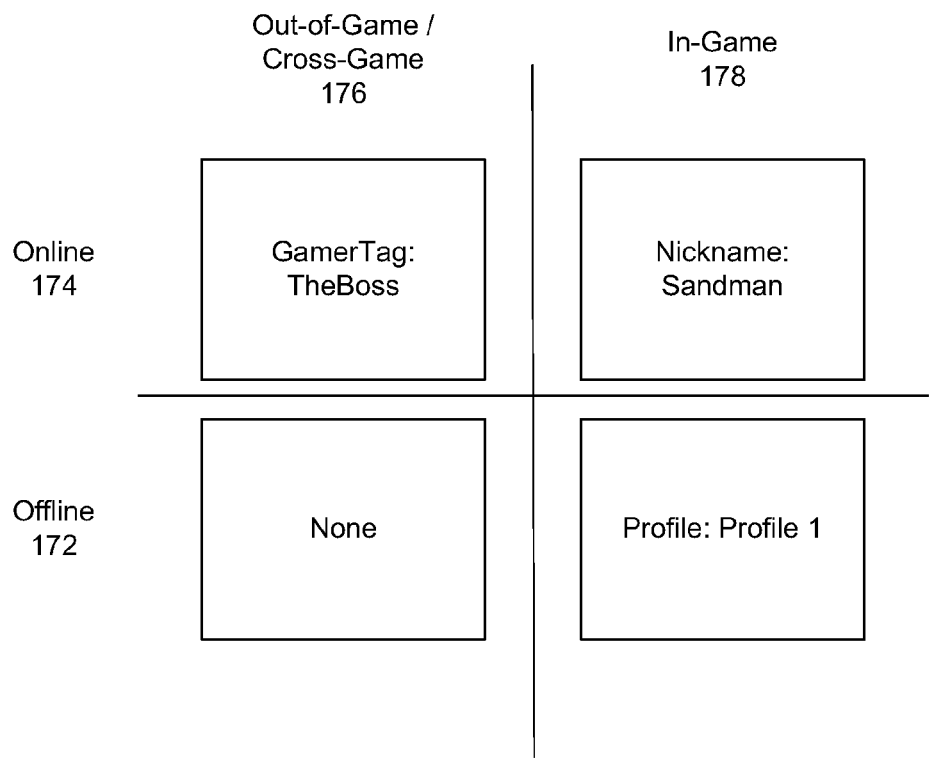
FIG. 4 illustrates the contexts over which the present invention operates to maintain a unified player identity.

Additionally, a sign-in is provided as part of a ubiquitous identity that extends across multiple contexts, thus enabling a consistent player identity offline and online. Referring to FIG. 4, there are illustrated the contexts over which the present invention operates—offline 172, online 174, out-of-game/cross-game 176, and in-game 178, which represents a convention console environment. The unified sign-in, combined with a mechanism for tracking offline player activity, advantageously eliminates the problems in conventional consoles where players must juggle between profiles and accounts, sharing them with other players, and are unable to accumulated game achievements while playing offline.

In addition, a player may create the in-game profile, such that default options and information (e.g., name, controller settings, etc.) are automatically set. The in-game profiles may be automatically associated with offline accounts so each time a player plays a game, the profile is selected based on the offline account. This minimizes the configuring and tweaking necessary for a player to get started in a new game or to continue in an old game after signing in.

A player may sign-in under a single account that associates online activity that is out-of-game/cross game, and/or online activity that is in-game, and/or activity that is offline and in-game with that account, and/or offline out-of-game use. While online, the service 158, games 154 and console 100 track activity of gamers and provide usage statistics in the Gamer Profile 166. While offline, the game console 100 and games 154 track the gamer's activity via a mechanism for instrumenting games to collect detailed information about a specific player's in-game statistics and accomplishments.

The offline mechanism of the present invention provides several functionalities. The first is caching and uploading achievements when an offline account is enabled for an online account with the service 158. This allows players who have been using their offline accounts to upload achievements collected offline to their Gamer Profile 166. This way, players can accumulate achievements offline that are credited towards online activities, e.g., tournaments, etc. that require high levels of achievements. The second functionality is caching and uploading achievements after playing offline. Players can play games on the console 100 anywhere, any time, and the statistics and achievements are updated to the service 158 to reflect the play. This functionality also operates for new games that have yet to be played online. The Gamer Profile 166 is updated during the next connection to the service 158 to reflect the offline play.

A third functionality of the offline mechanism is caching and uploading achievements after a connectivity failure (e.g., an offline synchronization). At first, players may be hesitant to use a wireless router for online play because of dropped connections. Because the present invention caches the statistics during transient connectivity problems, achievements are updated online even if there are network problems. Additional functionalities may include viewing offline achievements when signed-in online, or while offline, etc.

Figure 5:
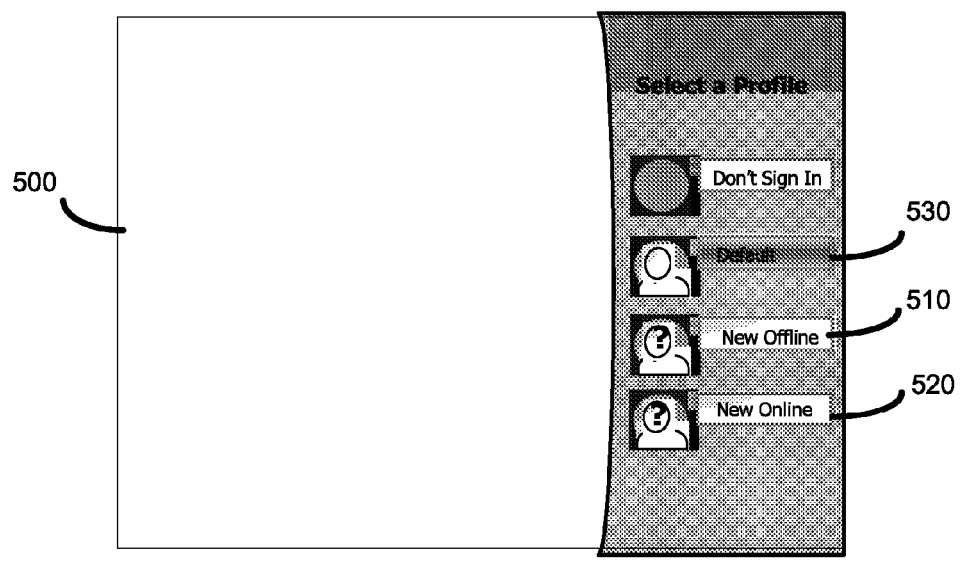
FIGS. 5 and 6 illustrate exemplary user interfaces for creating, accessing and using the unified player identity.

The process for creating and using a single sign in and offline accounts will now be described. Referring to FIG. 5, the first time a player plays on the console 100, she may select to create a new offline or online profile from user interface 500. If the user selects an offline profile 510, the new user may create an account using a GamerTag whereby default settings are applied. After the offline account is created, in-game profiles, game saves and game achievements are organized and associated with the account. She may also choose default game settings, such as vibration OFF and inverter controls ON at this time.

When players sign-up for an online account 520 with the service 158 using the interface 500, it may be possible that the GamerTag they selected for their offline account is already taken. Therefore, they must change their GamerTag for the new online account. If they accept the change, the offline account GamerTag renamed to the new GamerTag. Any accumulated offline achievements will be credited to the new online account so experienced players do not have to "start over" to show others online that they are worthy players.

Figure 6:
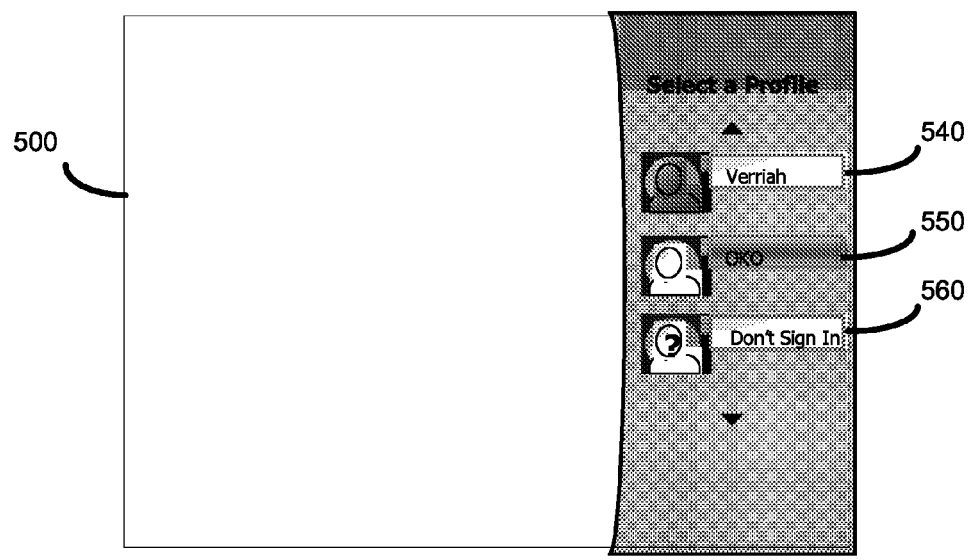

After an account is created (e.g., OKO), the user may select the account as the default 530. The console 100 may automatically sign in the user when the game boots and provide a pop-up message such as "Welcome back, OKO (Press a button to sign-in somebody else)," require the user to select the default account as shown in FIG. 5, or provide a list of profiles from which to select, e.g., 540, 550, 560 as shown in FIG. 6. After the user signs in, the user may select information related to the profile, gaming play, or other options. For example, in the context of a racing game, statistics such as total points, mileage, hours driven, license, unlocks may be shown after the profile is selected.

The offline account may be stored on the memory unit 146 so may be transported from one console 100 to another. This is advantageous, for example, if the player would like to play in a local tournament, where she can bring her memory unit 146 with her offline account and in-game profile on it.

Figure 7:
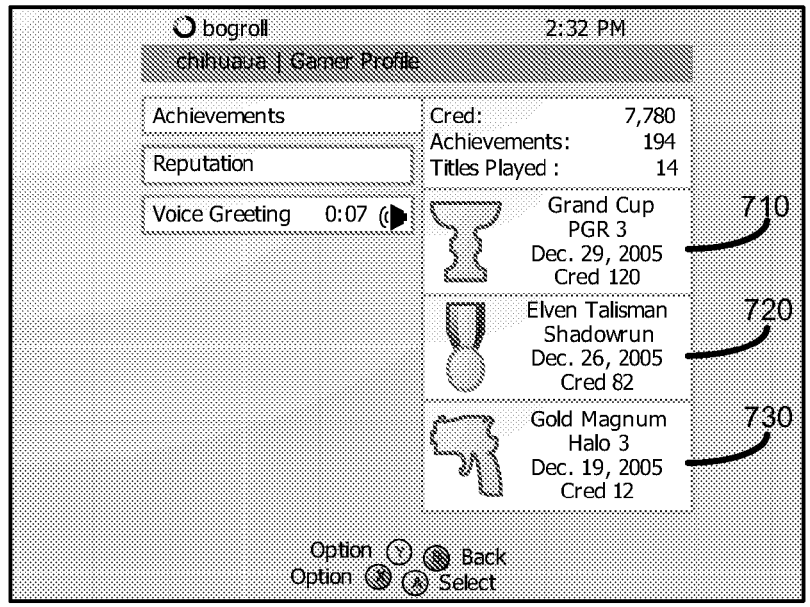
FIG. 7 illustrates various manifestations of game achievement stamps for a variety of different games.

As noted above, the Gamer Profile 166 conveys, among other things, game achievements. As shown in FIG. 7, players will be rewarded with game achievements based mastering certain in-game facets of the games they play. Each game achievement may be conveyed in the Gamer Profile 166 as a particular stamp, e.g., a trophy, badge, title, description, date, etc. Games may supply a screen snapshot or some other rich media captured at the moment the player earned a given achievement. This too may be displayed as part of the Gamer Profile 166. Players will accumulate gamer Cred (a points-based reward system) based on game achievements. As shown in FIG. 7, the player has a gamer Cred of 7,780. The display interface of FIG. 7 may be made available within the console 100 or via, e.g., a web browser, etc.

In general, the player's total gamer Cred is an aggregation of gamer Cred awarded through the play of one or more games (e.g., Title A and Title B). Each game may award up to a certain amount of game Cred (e.g., 200) that is divided into game-defined achievements and standard system achievements.

For example, Title A may be a relatively easy game to master and may award a total of 100 game-defined gamer Cred points. Within Title A, there may be several achievements (e.g., Campaign completed on hardest, multiplayer level 10, etc.) The relative weight of each of the achievements is set based on the total weight (e.g., Campaign completed on hardest is 10/36 or 27.8%). If a player completes this achievement, then the player may be awarded 27.8% of the 100 total gamer Cred points, or 28, rounded to the nearest integer value. A player is preferably credited with an achievement only once.

The standard system achievements make up the remaining 100 points in the example. The standard system achievements may be applied to all games. They may include achievements such as a first sign-in to a title, completing a first session with a game, completing a first hour of a game, completing 100 sessions with a game, completing 10 hours with a game, completing a game, etc. Other system achievements may be defined as necessary. The system achievements may be weighted such that a first sign-in is awarded a relative few points, whereas completing 100 sessions is awarded a higher number points.

Figure 8:
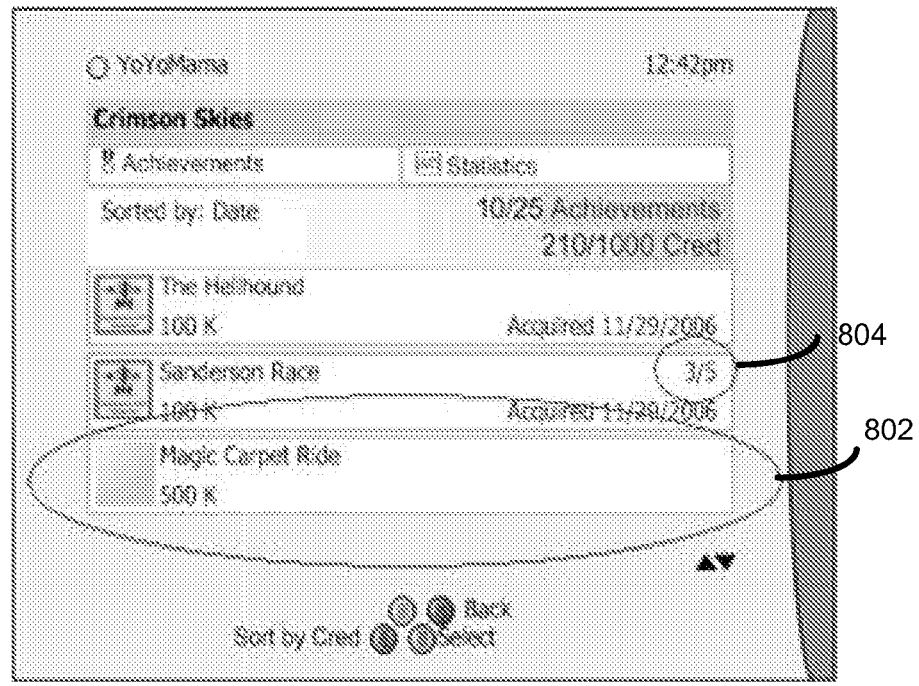
FIG. 8 illustrates an achievement display for a single gamer profile for a single game.

FIG. 8 illustrates another view of achievements. In this example, the achievements garnered by gamer YoYoMama for a particular game, "Crimson Skies," is shown. The achievements here illustrate that YoYoMama has acquired stamps for achievements Hellhound and Sanderson Race but has yet to acquire stamps for the achievement 802 for Magic Carpet Ride. Note also that this example display shows that the Sanderson Race achievement stamp was acquired at a level 804 of 3 out of a possible 5. Hence, another gamer may have acquired the same achievement stamp at a higher level. The various levels may be accorded meaningful labels such as gold, silver, bronze, etc.

Figure 9:
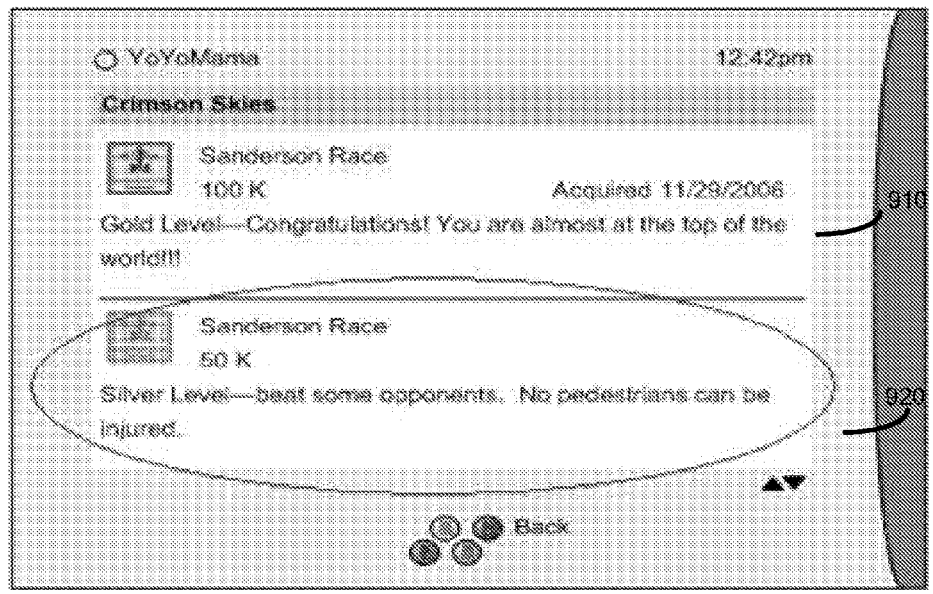
FIG. 9 illustrates variations in an achievement stamp display for various levels of achievement.

FIG. 9, for example, illustrates the various levels that were acquired for Sanderson Race. Here, the Gamer YoYoMama acquired a stamp at the gold level 910 and is accorded 100 k points for that achievement. Note that a stamp at the silver level 920 would only result in 50 k points. As such an achievement can have different levels and gradations that are indicative of a particular players skill level for a particular game relative to another player of the same game. The various levels may be reflected in the coloration, shading, shape, etc. of a particular stamp for that achievement, so that players can get a visual cue from the stamp of a players relative achievement level.

Figure 10:
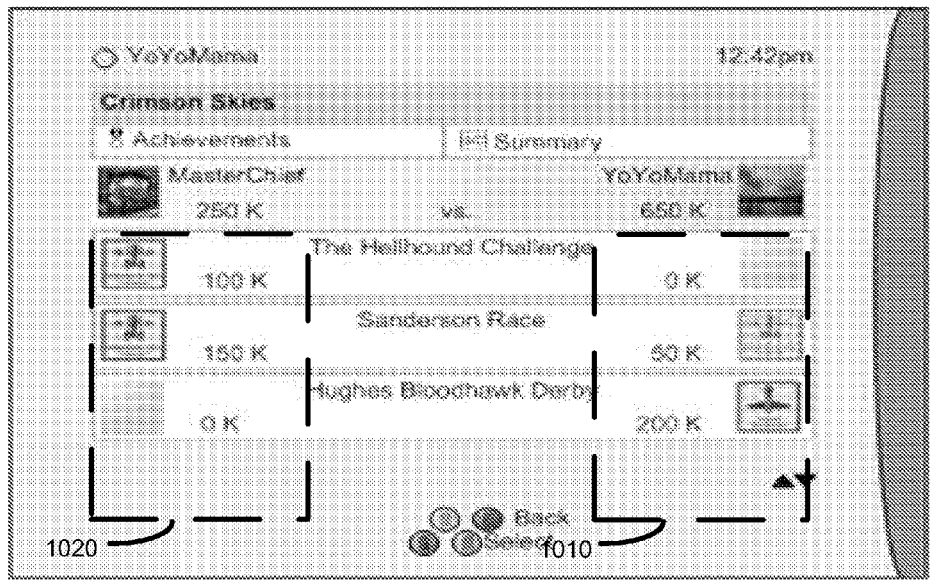
FIG. 10 illustrates a comparison of the achievements for two different gamer profiles as it may appear when displayed on a gaming console.

FIG. 10 illustrates a side-by-side comparison of achievements for two different players, YoYoMama and MasterChief. Here, YoYoMama's achievements 1010 are compared to MasterChief's achievements 1020 for the game Crimson Skies. MasterChief has accumulated 250 K achievement points whereas YoYoMama has achieved 650 K achievement points. Nevertheless, the side-by-side comparison, illustrates that while MasterChief has acquired a 100 K point achievement on the Hellhound Challenge, YoYoMama has not acquired any points for that same achievement. Similarly, while MasterChief and YoYoMama have both acquired the Sanderson Race achievement, MasterChief has done so at a higher level, acquiring 150 K achievement points to YoYoMama's 50 K achievement points. Additionally, YoYoMama has acquired some achievements that have not been acquired by MasterChief. For example, YoYoMama has acquired the Highes Bloodhawk Derby achievement, but MasterChief has not.

Figure 11:
FIG. 11 illustrates a comparison of the achievements for two different gamer profiles as it may appear when displayed by a browser.

FIG. 11 further illustrates the comparison feature (again shown in side-by-side fashion although other configurations are possible). Here, the achievements are compared by navigating to a web site using an typical web browser, i.e. a game console is not needed to perform the comparison. In this example, the achievements 1110 of a gamer "Tonic" are compared toe the achievements 1120 of a gamer "X." This example indicates the a gamer has unlocked an achievement to acquire it, while achievements that have not been acquired are locked. After an achievement has been unlocked, see, e.g., achievement 110a, that achievement stamp is highlighted to provide a visual cue of the unlocked state. For an achievement that is still locked, e.g., 1120a, the stamp remains a shade of grey to indicate its locked state. A bar graph, e.g., 1110a, indicates the percentage of achievements that have been unlocked by a particular gamer.

Figure 12A:
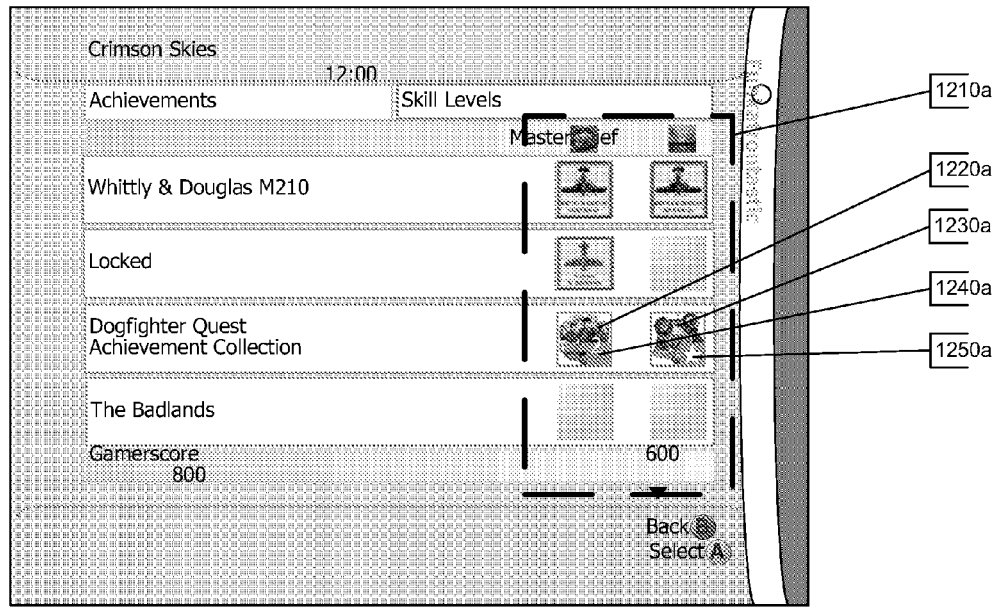
FIGS. 12A and 12B provide various illustrative mechanisms for displaying tier levels for game achievements.
Figure 12B:
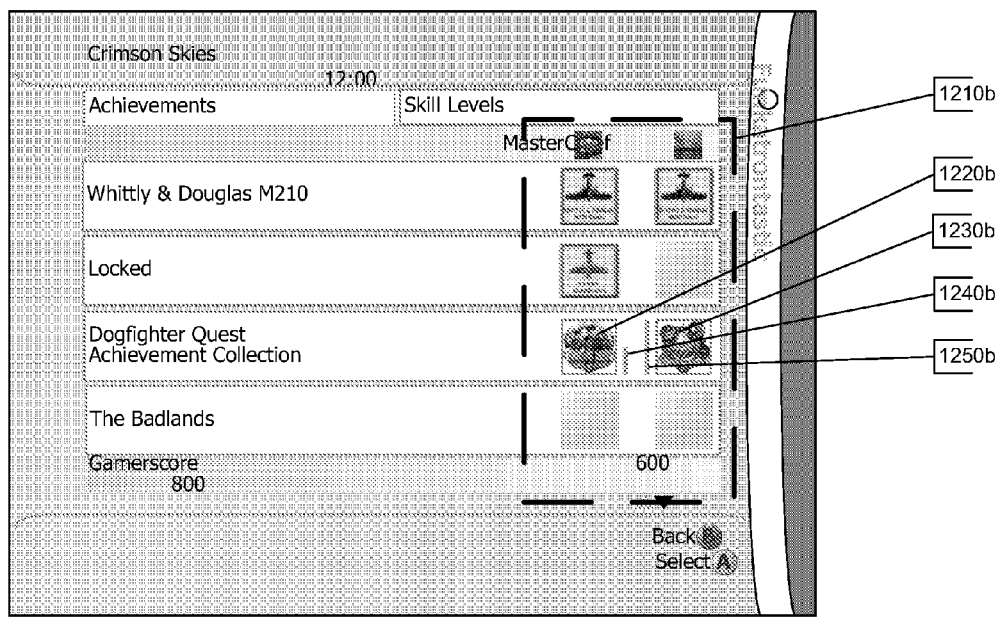

FIGS. 12A and 12B illustrate displays of achievement tiers of levels associated with an achievement. The achievement level indicates that a gamer not only unlocked a particular achievement but also indicates that the gamer achieved a certain level in unlocking that achievement.

FIG. 12A shows a display of achievement information for two garners in a side-by-side fashion. Here, each gamer has unlocked certain achievements that are shown in box 1210a. The achievements in this particular example are for the Crimson Skies game. Both of the garners have unlocked several of the achievements for that game, such as Whittly and Douglas M210, Dogfighter Quest, and so on. With respect to Dogfighter Quest, both garners have the achievement stamp, e.g., 1220a and 1230a, respectively. Here, however, the tier level indicators 1240a and 1250a are different because both garners have not attained the same tier within that achievement. The indicator 1240a is a number. In this instance, a higher number is indicative of a higher tier level. The indicator 1250a is not a number but instead is a star or a check box indicating that the game has competed all of the tiers for that particular achievement.

FIG. 12B also shows a display of achievement information for two garners in a side-by-side fashion. This display provides an alternative mechanism for indicating the tier levels achieved. Here, each gamer has again unlocked certain achievements that are shown in box 1210b. The achievements in this example are the same as the previous example and are for the Crimson Skies game. The same achievements as in the previous example are also unlocked in this example. That is, both of the garners have unlocked achievements such as Whittly and Douglas M210, Dogfighter Quest, and so on. With respect to Dogfighter Quest, both garners have the achievement stamp, e.g., 1220b and 1230b, respectively. Here, however, the tier level indicators 1240b and 1250b are different from each other (and different from the illustration of FIG. 12A) because both garners have not attained the same tier within that achievement. The indicator in this example is represented by progress bars, e.g. 1240b and 1250b. In this instance, a longer progress bar is indicative of a higher tier level.

Thus, the present invention provides a game achievements system that allows comparison of achievements tiers a gaming environment. Although the various examples used herein provide particular mechanisms for displaying tier levels, the notion of providing an indicator of tier level may also be extended to other mechanisms to illustrate the relative tier level differences among players.

What is claimed:

1. A method of displaying game achievements, said method comprising:

executing a program on a game console in association with a profile associated with a unique player identity, said profile configured for use on a per program basis and configured for use across a plurality of programs and contexts;

receiving at least one indicator that is stored in said profile, said indicator being indicative of completion of an achievement for at least one program played on the game console, each program having a plurality of achievements that may be earned;

receiving an indicator that is indicative of a tier of the achievement in association with the indicator indicative of the achievement, the tier of the achievement indicating a performance level associated with unlocking the achievement, the achievement having associated therewith gamer cred, said gamer cred associated with achievements across the plurality of programs and contexts; and presenting on a display the at least one indicator in said profile indicative of said achievement.

2. The method of claim 1, further comprising:

sending a request to store the profile to a remote computer system via a packet based network.

3. The method of claim 1 wherein the executing of the program comprises the execution of a game.

4. The method of claim 1 wherein the indicator indicative of the achievement comprises a graphic.

5. The method of claim 1, further comprising:

displaying a bar graph, wherein a size of the bar graph is based on a percentage of achievements that have been unlocked.

6. The method of claim 1, wherein the indicator indicative of the tier comprises a number.

7. The method of claim 1, further comprising:

accessing the profile using an internet browser to retrieve the indicator that is indicative of the tier of the achievement.

8. The method of claim 1, wherein the player profile comprises an indicator an aggregation of gamer cred received from a plurality of programs.

9. The method of claim 1, wherein the achievement has associated therewith a set of tiers, and each tier within the set of tiers has associated therewith a portion of the gamer cred associated with the achievement.

10. A tangible computer-readable medium bearing computer-executable instructions, the tangible computer-readable medium comprising:

accessing a data store comprising a plurality of user profiles, said profiles comprise information gathered from playing at least one video game on a game console, said profiles configured for use on a per program basis and configured for use across a plurality of programs and contexts;

selecting a user profile from said data store;

extracting from said user profile information related to achievements unlocked by the selected user and information indicative of a tier of the achievement, the tier being one of a plurality of tiers for the achievement and wherein the tier indicates a performance level associated with unlocking the achievement, and each achievement having associated therewith an amount of gamer cred, said gamer cred associated with achievements across the plurality of programs and contexts; and displaying the achievement and a graphic indicative of the tier.

11. The tangible computer-readable medium of claim 10, wherein the graphic comprises one of a number and a bar graph.

12. The tangible computer-readable medium of claim 10, further comprising: accessing the data store over a packet based network using a browser.

13. The tangible computer-readable medium as recited in claim 10 comprising accessing the data store via the game console.

14. A game console for displaying game achievements, comprising:

a processor; and computing memory communicatively coupled to the processor, the computing memory having stored therein computer executable instructions for:

executing an application programming interface (API) while running a video game, wherein the API is configured to:

unlock an achievement at a remote service, wherein a plurality of achievements can be unlocked in the video game;

access, over a network, a data store that stores a plurality of profiles, each profile of the plurality includes information related to the achievements of a unique user and each profile is configured for use on a per program basis and configured for use across a plurality of programs and contexts;

retrieve from said data store an achievement associated a user profile and an indicator for a tier of the achievement, said achievement associated with a plurality of tiers;

wherein each achievement has associated therewith, gamer cred, said gamer cred associated with achievements across the plurality of programs and contexts, wherein the indicator is indicative of a tier level associated with the achievement where the tier level indicates a certain performance level associated with unlocking the achievement; and displaying the retrieved achievement and the retrieved indicator for the tier of the achievement.

15. The game console of claim 14, wherein the network comprises a packet based network.

16. The game console of claim 14, wherein displaying the retrieved achievement comprises displaying a graphical indicator indicative of the achievement.

17. The game console of claim 16, further comprising:

displaying a bar graph, wherein a size of the bar graph is based on a percentage of achievements that have been unlocked.

18. The game console 16, wherein the indicator indicative of the tier comprises a number.

* * * * *